United States Patent
Rho

(10) Patent No.: US 9,513,991 B2
(45) Date of Patent: Dec. 6, 2016

(54) SEMICONDUCTOR APPARATUS PERFORMING PROGRAM LOOP BY USING ERROR INFORMATION AND METHOD OF OPERATING THE SAME

(71) Applicant: SK hynix Inc., Gyeonggi-do (KR)

(72) Inventor: Jun Rye Rho, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 243 days.

(21) Appl. No.: 13/844,910

(22) Filed: Mar. 16, 2013

(65) Prior Publication Data

US 2014/0208187 A1    Jul. 24, 2014

(30) Foreign Application Priority Data

Jan. 18, 2013  (KR) .......................... 10-2013-0006018

(51) Int. Cl.
    *G06F 11/10* (2006.01)
    *G06F 11/00* (2006.01)

(52) U.S. Cl.
    CPC ................................. *G06F 11/1048* (2013.01)

(58) Field of Classification Search
    None
    See application file for complete search history.

(56) References Cited

U.S. PATENT DOCUMENTS

| | | | | |
|---|---|---|---|---|
| 6,339,546 B1* | 1/2002 | Katayama et al. | ...... | 365/185.09 |
| 8,812,933 B2* | 8/2014 | Joo | ........ | G11C 16/10 |
| | | | | 365/185.09 |
| 2010/0211834 A1* | 8/2010 | Asnaashari et al. | .......... | 714/718 |
| 2010/0321998 A1* | 12/2010 | Jang | ........................ | 365/185.03 |
| 2011/0113306 A1* | 5/2011 | Eggleston et al. | ............ | 714/773 |
| 2012/0163080 A1* | 6/2012 | Shalvi et al. | ............ | 365/185.03 |
| 2012/0246507 A1* | 9/2012 | Luo et al. | ........................ | 714/2 |
| 2013/0145234 A1* | 6/2013 | Yoon et al. | .................... | 714/773 |

FOREIGN PATENT DOCUMENTS

KR    1020090102115    9/2009

* cited by examiner

*Primary Examiner* — Justin R Knapp
(74) *Attorney, Agent, or Firm* — IP & T Group LLP

(57) ABSTRACT

A semiconductor apparatus includes a memory device configured to include a buffer memory block and a main memory block, and to correct data read from the buffer memory block based on error information, and to perform a program loop to store corrected data in the main memory block, and a memory controller configured to perform an error checking and correction (ECC) operation on the data and to output the error information obtained through the ECC operation to the memory device.

14 Claims, 10 Drawing Sheets

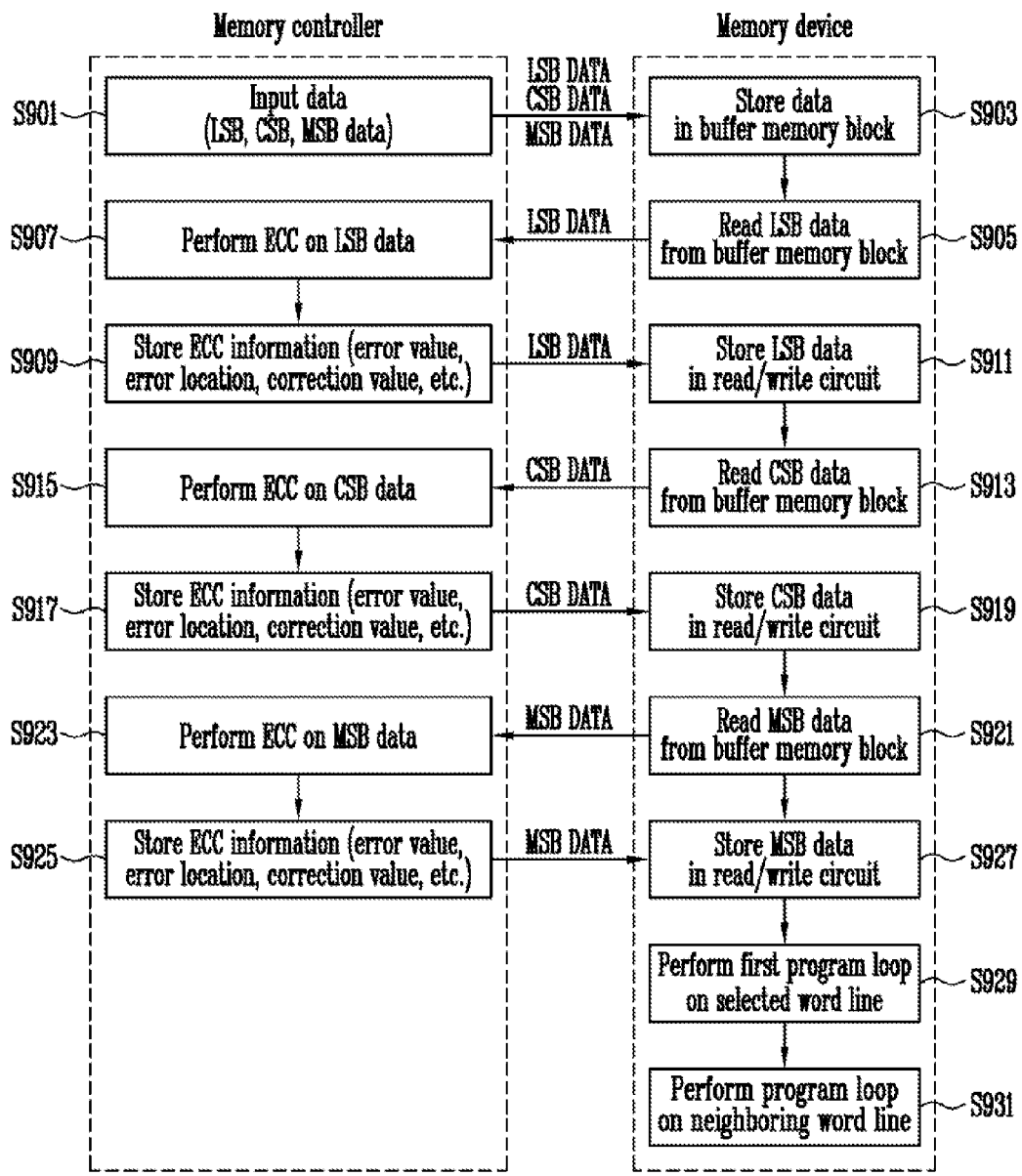

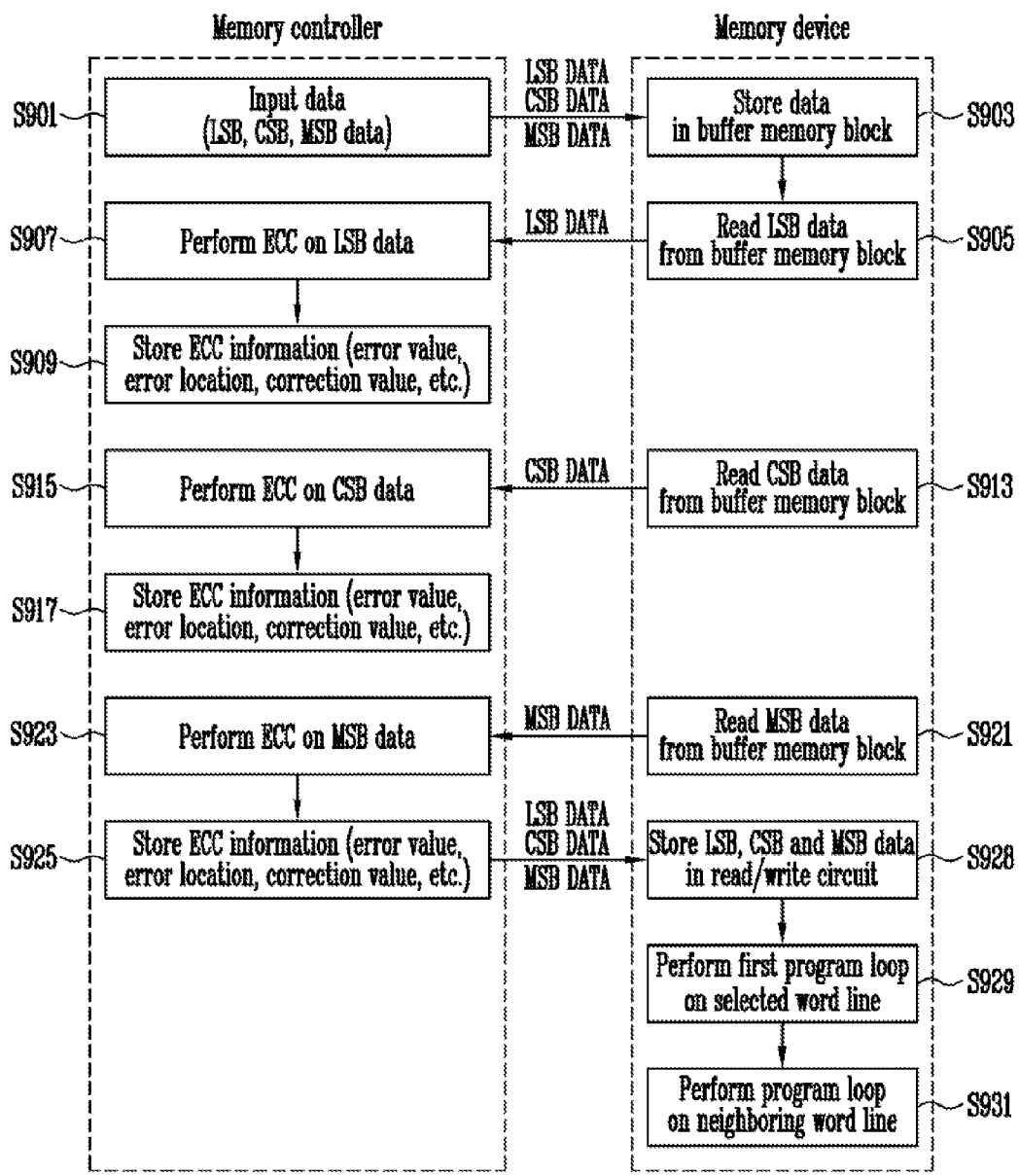

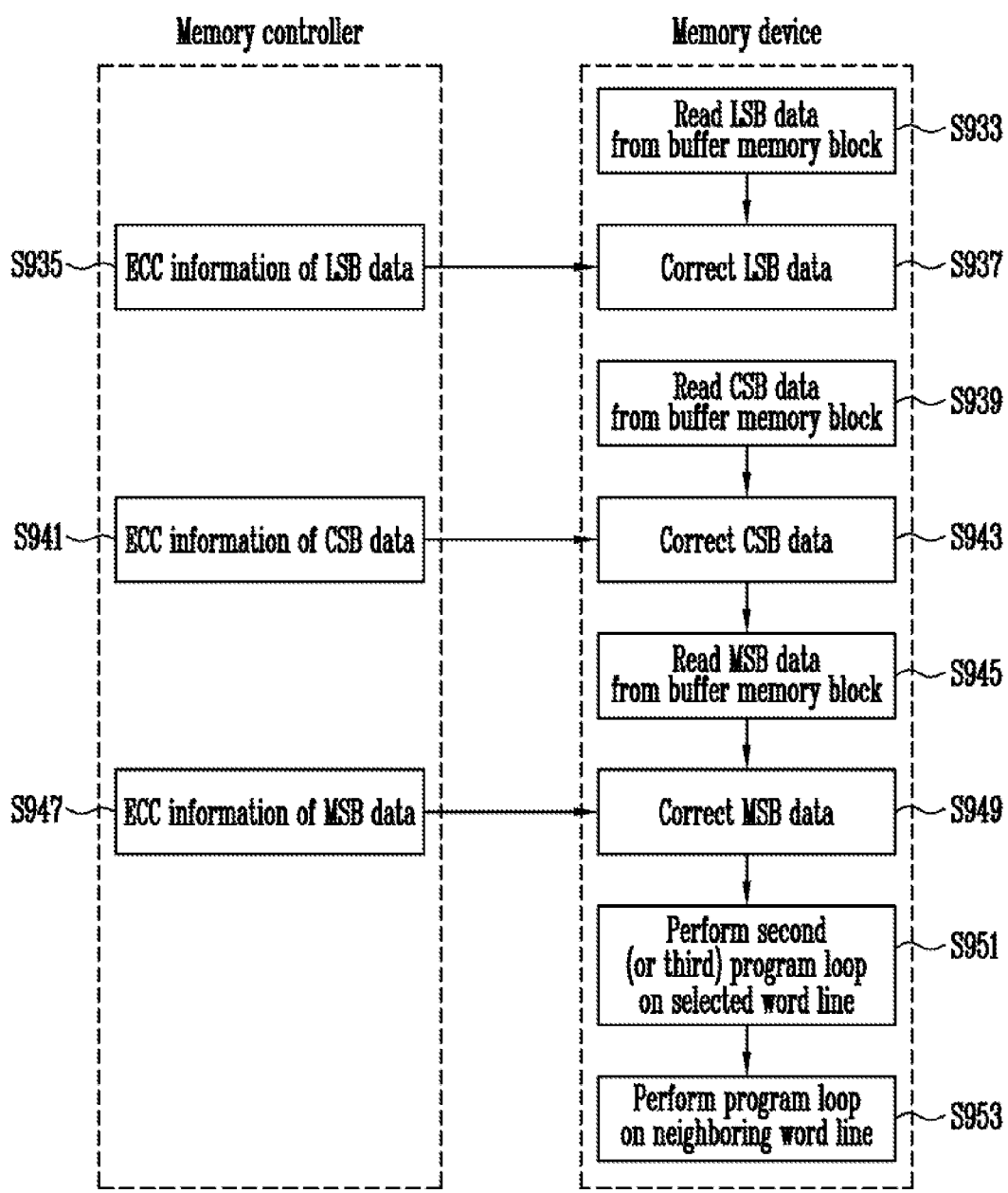

SEMICONDUCTOR APPARATUS PERFORMING PROGRAM LOOP BY USING ERROR INFORMATION AND METHOD OF OPERATING THE SAME

CROSS-REFERENCE TO RELATED APPLICATION

Priority is claimed to Korean patent application number 10-2013-0006018, filed on Jan. 18, 2013 the entire disclosure of which is incorporated herein by reference in its entirety.

BACKGROUND

Field of Invention

Exemplary embodiments of the present invention relate to semiconductor design technology, and more particularly, to a semiconductor apparatus allowing data input and output and a method of operating the same.

Description of Related Art

A NAND flash memory device may be operated using a multi level cell (MLC) method in which two bits of data are stored in a single memory cell or a triple level cell (TLC) method in which three bits of data are stored in a single memory cell. In an MLC NAND flash memory device, LSB data and MSB data are stored in a single memory cell. In a TLC NAND flash memory device, LSB data, CSB data, and MSB data are stored in a single memory cell.

In a NAND flash memory device, memory cells coupled to a word line may form a page, and a single physical page may be divided to multiple logical pages. For example, in a TLC NAND flash memory device, a single physical page may include an LSB page, a CSB page, and an MSB page.

To store multiple bits of data in a single memory cell, threshold voltage distributions of memory cells are to be divided at various levels based on data being stored. For example, in a TLC flash memory device, since three bits of data are stored in a single memory cell, threshold voltage distributions may be divided into eight levels. In this example, since the margin between the distributions decreases and the degree of integration increases, the amount of error bits caused by program interference may increase. However, data errors within a predetermined range may be corrected through error checking and correction (ECC) operation.

Although the error bits may be corrected by performing the ECC operation, an operation time required to perform a program loop to store data may be increased due to the ECC operation. In particular, in a data input operation using a TLC method, whenever an LSB program loop for storing LSB data, a CSB program loop for storing CSB data, and an MSB program loop for storing MSB data are performed, ECC operations are to be performed on the LSB data, the CSB data, and the MSB data, respectively, and thus the operation time may increase.

BRIEF SUMMARY

Exemplary embodiments of the present invention relate to a semiconductor apparatus that may improve operation reliability and reduce operation time and a method of operating the same.

A method of operating a semiconductor apparatus in accordance with an embodiment of the present invention may include correcting first data read from a buffer memory block based on first error information obtained by performing a first error checking and correction (ECC) operation on the first data, correcting second data read from the buffer memory block based on second error information obtained by performing a second ECC operation on the second data, and performing a program loop on memory cells coupled to a selected word line in a main memory block based on the first data and the second data corrected by using the first error information and the second error information, respectively.

A method of operating a semiconductor apparatus in accordance with another embodiment of the present invention may include correcting first data read from a buffer memory block based on first error information obtained by performing a first error checking and correction (ECC) operation on the first data, correcting second data read from the buffer memory block based on second error information obtained by performing a second ECC operation on the second data, correcting third data read from the buffer memory block based on third error information obtained by performing a third ECC operation on the third data, and performing a program loop on memory cells coupled to a selected word line in a main memory block based on the first data to the third data corrected by using the first error information to the third error information, respectively.

A semiconductor apparatus in accordance with an embodiment of the present invention may include a memory device configured to include a buffer memory block and a main memory block, and to correct data read from the buffer memory block based on error information, and to perform a program loop to store corrected data in the main memory block, and a memory controller configured to perform an error checking and correction (ECC) operation on the data and to output the error information obtained through the ECC operation to the memory device.

BRIEF DESCRIPTION OF THE DRAWINGS

FIGS. 9 to 11 are transaction flowcharts each illustrating a method of operating the semiconductor apparatus shown in FIG. 8.

DESCRIPTION OF EMBODIMENTS

Figure 1:
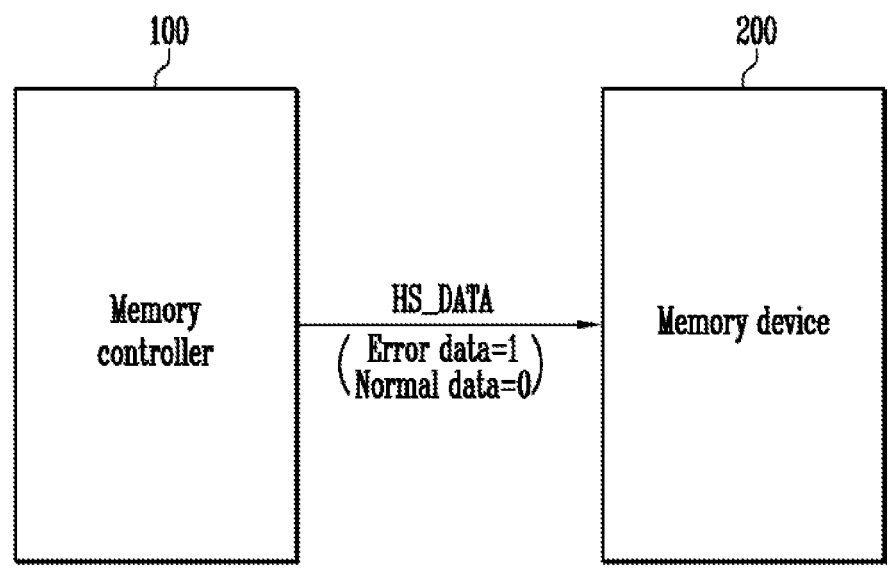
FIG. 1 is a block diagram illustrating a semiconductor apparatus in accordance with an embodiment of the present invention.

Hereinafter, an exemplary embodiment of the present invention will be described with reference to the accompanying drawings in detail. However, the present invention is not limited to an embodiment disclosed below and may be implemented in various forms. The embodiment is provided only for illustrative purposes and for full understanding of the scope of the present invention by those skilled in the art, and the scope of the present invention will be understood by the claims of the present invention. Throughout the disclosure, reference numerals correspond directly to the like parts in the various figures and embodiments of the present invention. It is also noted that in this specification, "connected/coupled" refers to one component not only directly coupling another component but also indirectly coupling another component through an intermediate component. In addition, a singular form may include a plural form as long as it is not specifically mentioned in a sentence.

FIG. 1 is a block diagram of a semiconductor apparatus in accordance with an embodiment of the present invention.

Referring to FIG. 1, a semiconductor apparatus 10 may include a memory controller 100 and a memory device 200.

The memory device 200 may be configured to correct data read from a buffer memory block based on error information HS_DATA and to perform a program loop to store corrected data to a main memory block.

The memory controller 100 may be configured to perform an ECC operation on the data and output the error information HS_DATA, which is obtained by performing the ECC operation, to the memory device 200. The error information HS_DATA may include a location and a correction value of an error bit included in the data. For example, the error information HS_DATA may have substantially the same size as the data read from the buffer memory block. A bit in the same location as the error bit of the data read from the buffer memory block may be '1', and the location of normal data may be '0' in the data. In another exemplary embodiment, the bit in the same position as the error bit of the data may be '0', and the location of the normal data may be '1'.

The error information HS_DATA may be stored in the memory controller 100.

Figure 2:
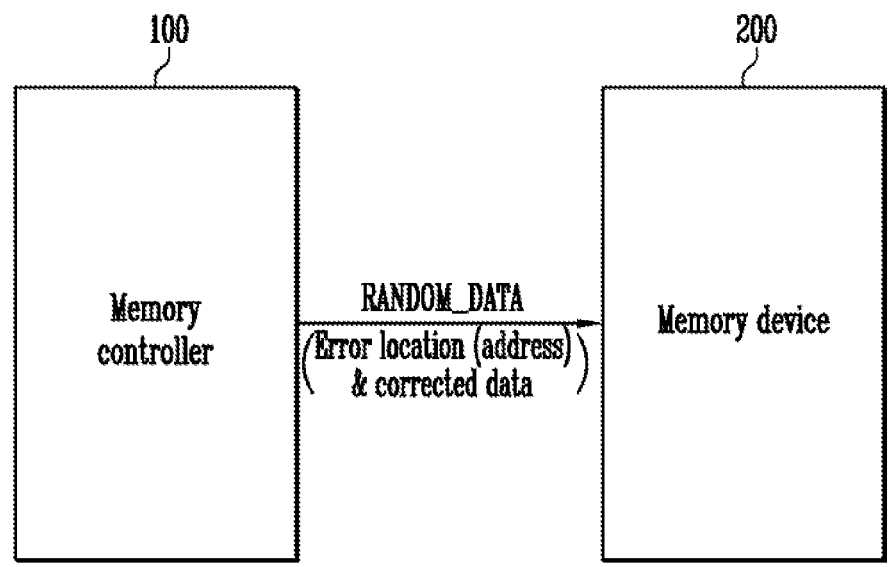
FIG. 2 is a block diagram illustrating a semiconductor apparatus in accordance with another embodiment of the present invention.

FIG. 2 is a block diagram illustrating a semiconductor apparatus in accordance with another embodiment of the present invention.

Referring to FIG. 2, error information RANDOM_DATA may include a location and a correction value of an error bit included in data read from a buffer memory block. For example, the error information RANDOM_DATA may include a column address and a corrected bit of the error bit included in the data read from the buffer memory block.

The error information RANDOM_DATA may be stored in the memory controller 100.

As described above, since the memory device 200 may correct the error bit of the data based on the error information HS_DATA or RANDOM_DATA included in the controller 100, an increase in operation time caused by an ECC operation performed each time to correct the error bit of the data may be prevented. This will be described in more detail below.

Figure 3:
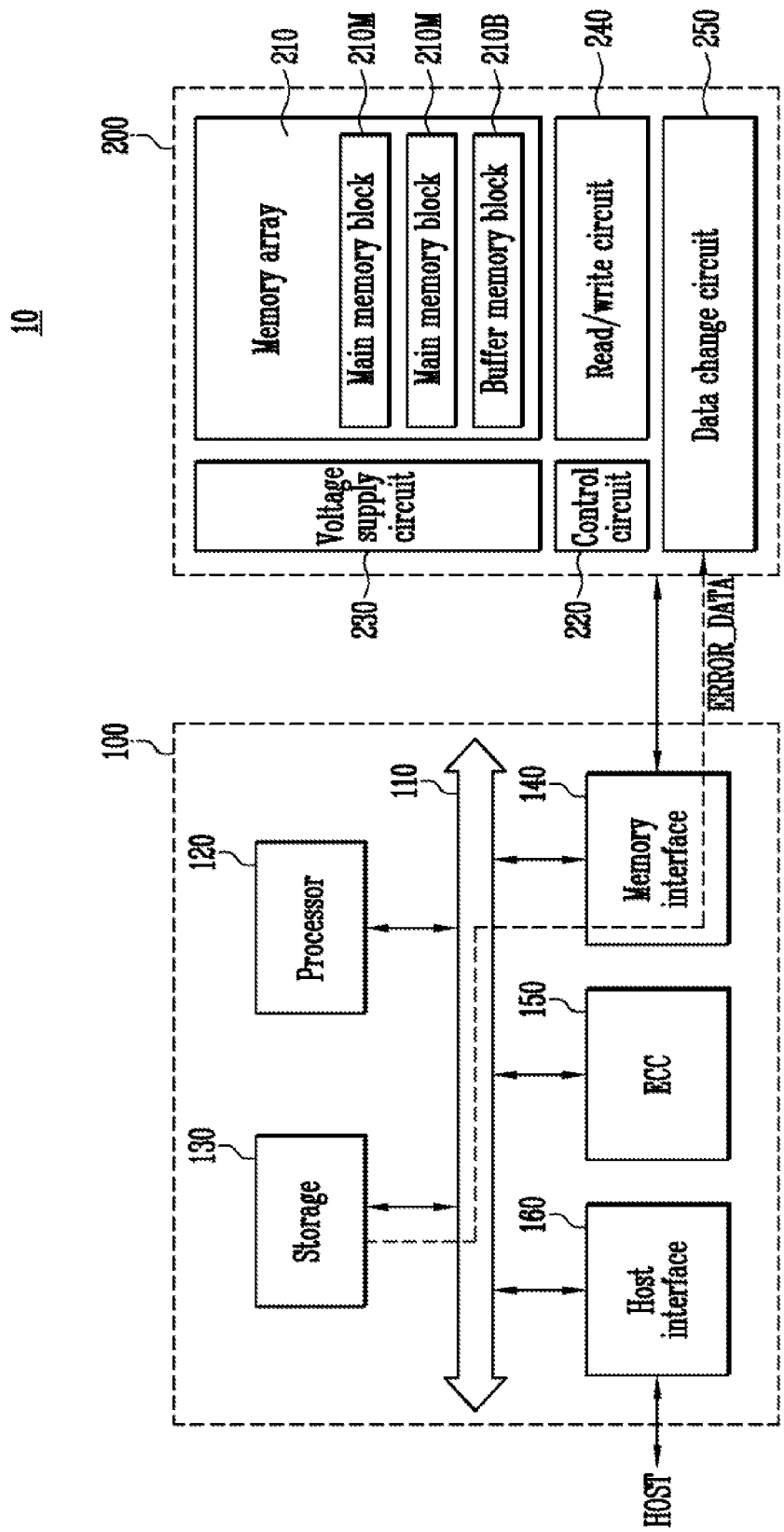
FIG. 3 is a detailed diagram illustrating a memory controller and a memory device shown in FIGS. 1 and 2.

FIG. 3 is a detailed diagram illustrating the memory device 200 and the memory controller 100 shown in FIGS. 1 and 2.

Referring to FIG. 3, the memory controller 100 may be configured to access the memory device 200 in response to a request from a host HOST. For example, the memory controller 100 may be configured to control a read operation, a program loop and an erase loop of the memory device 200. The memory controller 100 may be configured to provide an interface between the memory device 200 and the host HOST.

The memory controller 100 may include an internal bus 110, a processor 120, a storage 130, a memory interface 140, an ECC block 150, and a host interface 160. The internal bus 110 may be configured to provide a channel between components of the memory controller 100. For example, the internal bus 110 may be a common channel through which a command and data are transferred. In another example, the internal bus 110 may include a common channel and a data channel through which a command and data, respectively, are transferred.

The processor 120 may be configured to control the general operation of the memory controller 100. The processor 120 may be configured to execute software and firmware driven by the memory controller 100.

The storage 130 may be used as an operation memory of the processor 120, a buffer memory, or a cache memory between the memory device 200 and the host HOST. In addition, the storage 130 may store error information obtained by performing an ECC operation. For example, the storage 130 may include at least one of various random-access memories, such as Static RAM (SRAM), Dynamic RAM (DRAM), Synchronous DRAM (SDRAM), Phase-change RAM (PRAM), Magnetic RAM (MRAM), Resistive RAM (RRAM), Ferroelectric RAM (FRAM), and NOR flash memory.

The memory interface 140 may include a protocol for communication with the memory device 200. For example, the memory interface 140 may include at least one of flash interfaces, such as a NAND interface and a NOR interface.

The ECC block 150 may be configured to detect an error in data from the memory device 200 (especially, data read from the buffer memory block). The ECC block 150 may be configured to generate error information of the data obtained by performing the ECC operation.

The host interface 160 may include a protocol for data exchange between the host HOST and the memory controller 100. For example, the memory controller 100 may be configured to communicate with the outside (e.g., a host) through one of various interface protocols including a Universal Serial Bus (USB) protocol, a multimedia card (MMC) protocol, a peripheral component interconnection (PCI) protocol, a PCI-express (PCI-E) protocol, an Advanced Technology Attachment (ATA) protocol, a Serial-ATA protocol, a Parallel-ATA protocol, a small computer small interface (SCSI) protocol, an enhanced small disk interface (ESDI) protocol, and an Integrated Drive. Electronics (IDE) protocol.

The memory controller 100 and the memory device 200 may be integrated into a single semiconductor apparatus. For example, the memory controller 100 and the memory device 200 may be integrated into a single semiconductor apparatus, which may form a memory card. For example, the memory controller 100 and the memory device 200 may be integrated into a single semiconductor apparatus to form a PC card (personal computer memory card international association (PCMCIA)), a compact flash (CF) card, a smart media card (SM or SMC), a memory stick, a multimedia card (MMC, RS-MMC or MMCmicro), an SD card (SD, miniSD, microSD or SDHC), or universal flash storage (UFS). The memory controller 100 and the memory device 200 may be integrated into a single semiconductor apparatus to form a semiconductor drive (Solid State Drive (SSD)).

The memory device 200 may be configured to perform a program loop to input data. The memory device 200 may include a memory array 210 and peripheral circuits 220 to 250. When the memory device 200 is a flash memory device, the memory device 200 may include the memory array 210, a control circuit 220, a voltage supply circuit 230, a read/write circuit 240, and a data change circuit 250.

The memory array 210 may include a plurality of memory blocks 210M and 210B. The memory array 210 may include a main memory block 210M and a buffer memory block 210B. The main memory block 210M may correspond to a user region where data being externally input are stored, and the buffer memory block 210B may correspond to a region where data to be input to the main memory block 210M are temporarily stored. Data may be stored in memory cells of the main memory block 210M through a program loop using an MLC or TLC method. Since data are temporarily stored in the buffer memory block 210B, the data may be stored in memory cells of the buffer memory block 210B by using a Single Level Cell (SLC) method, which may ensure a data storage rate and stability.

The main memory block 210M and the buffer memory block 210B may have substantially the same configuration, which will be described below.

Figure 4:
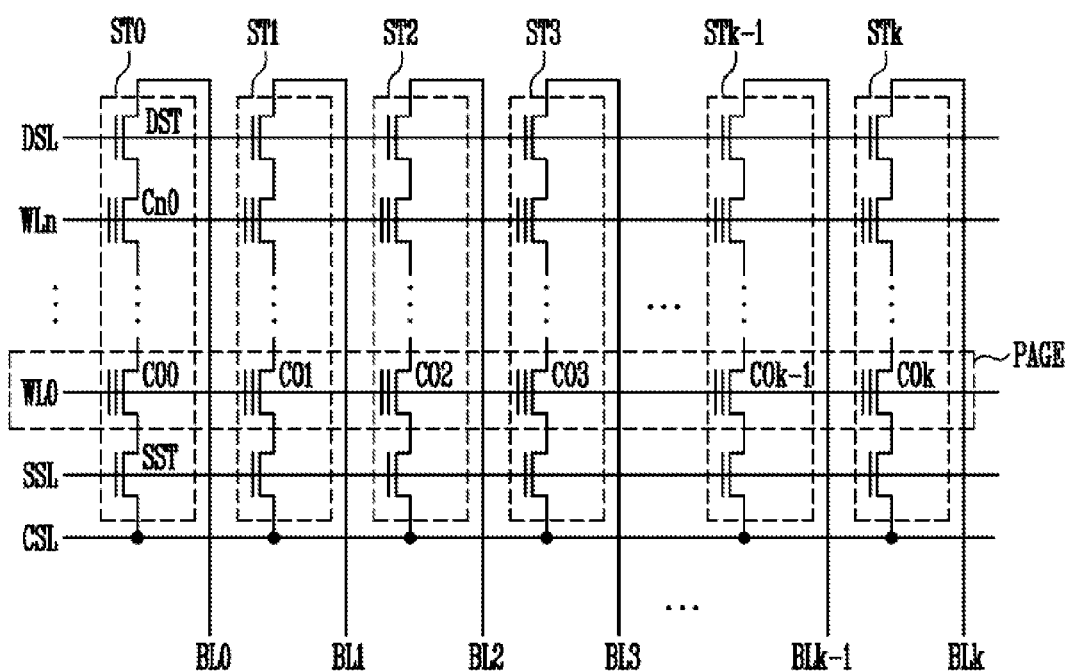
FIG. 4 is a detailed diagram illustrating memory blocks shown in FIG. 3.

FIG. 4 is a detailed diagram illustrating the memory blocks shown in FIG. 3.

Referring to FIG. 4, each of the memory blocks may include a plurality of memory strings ST0 to STk that are coupled between bit lines BL0 to BLk and a common source line CSL. In other words, the memory strings ST0 to STk may be coupled to the bit lines BL0 to BLk, respectively, and coupled in common to the common source line CSL. Each of the memory strings, for example, the memory string ST0 may include a source select transistor SST, a cell string, and a drain select transistor DST. A source of the source select transistor SST may be coupled to the common source line CSL. The cell string may include a plurality of memory cells C00 to Cn0 coupled in series with each other. A drain of the drain select transistor DST may be coupled to the bit line BL0. The memory cells C00 to Cn0 included in the cell string may be coupled in series between selection transistors SST and DST. A gate of a source select transistor SST may be coupled to a source selection line SSL. Gates of the memory cells C00 to Cn0 may be coupled to word lines WL0 to WLn, respectively. A gate of a drain select transistor DST may be coupled to a drain selection lines DSL.

The drain select transistor DST may control connection or disconnection between the cell string, which includes the memory cells C00 to Cn0, and the bit line BL0. The source select transistor SST may control connection or disconnection between the cell string, which includes the memory cells C00 to Cn0, and the common source line CSL.

In a NAND flash memory device, memory cells included in a memory cell block may be divided into a physical page unit or a logical page unit. For example, the memory cells C01 to C0k coupled to the word line WL0 may form a single physical page PAGE. In an MLC flash memory device, the physical page PAGE may include an LSB page for storing LSB data and an MSB page for storing MSB data. In addition, in a TLC flash memory device, the physical page PAGE may include an LSB page for storing LSB data, a CSB page for storing CSB data, and an MSB page for storing MSB data. The LSB page, the CSB page, and the MSB page may correspond to a logical page. A page (either a physical page or a logical page) may be a basic unit for a program loop or a read operation, and a memory block may be a basic unit for an erase loop.

Referring again to FIG. 3, the peripheral circuits 220 to 250 may be configured to perform a program loop, an erase loop, and a read operation on selected memory cells. In particular, the peripheral circuits 220 to 250 may perform a program loop using an MLC method that includes an LSB program loop and an MSB program loop to store two bits of data including LSB data and MSB data in a single memory cell. In addition, the peripheral circuits 220 to 250 may perform a program loop using a TLC method that includes an LSB program loop, a CSB program loop, and an MSB program loop to store three bits of data including LSB data, CSB data, and MSB data in a single memory cell.

The peripheral circuits 220 to 250 may be configured to correct data read from a memory block, e.g., the buffer memory block 210B based on error information ERROR_DATA input from the memory controller 100. The error information ERROR_DATA may be the error information described with reference to FIG. 1 and the error information described with reference to FIG. 2.

These peripheral circuits may include the control circuit 220, the voltage supply circuit 230, the read/write circuit 240, and the data change circuit 250.

The control circuit 220 may be configured to control the voltage supply circuit 230, the read/write circuit 240, and the data change circuit 250 during a program loop, a read operation, and an erase loop of memory cells.

The voltage supply circuit 230 may be configured to output operating voltages used for a program loop, a read operation, or an erase loop to the main memory block 210M or the buffer memory block 210B.

The read/write circuit 240 may be configured to sense and to latch data stored in memory cells through bit lines during a read operation, or selectively supply a program inhibit voltage and a program enable voltage to the bit lines based on data being stored in the memory cells when a program loop is performed. The read/write circuit 240 may be realized as a page buffer.

The data change circuit 250 may be configured to correct the data from the memory block 210B based on the error information ERROR_DATA input from the memory controller 100 by the read/write circuit 240. For example, the data change circuit 250 may control the data stored in the read/write circuit 240 so that the data, which is read from the memory block and stored in an internal latch (not illustrated) of the read/write circuit 240, may be corrected based on the error information ERROR_DATA. In another example, when the data stored in the internal latch (not illustrated) of the read/write circuit 240 are output to the data change circuit 250, the data change circuit 250 may correct an error bit of the data by performing an XOR operation using the error information input from the memory controller 100, and may output corrected data to the read/write circuit 240. Subsequently, the corrected data may be stored in another memory block, e.g., the main memory block 210M by the read/write circuit 240.

Hereinafter, a method of operating the above-described semiconductor apparatus is described in more detail.

Figure 5:
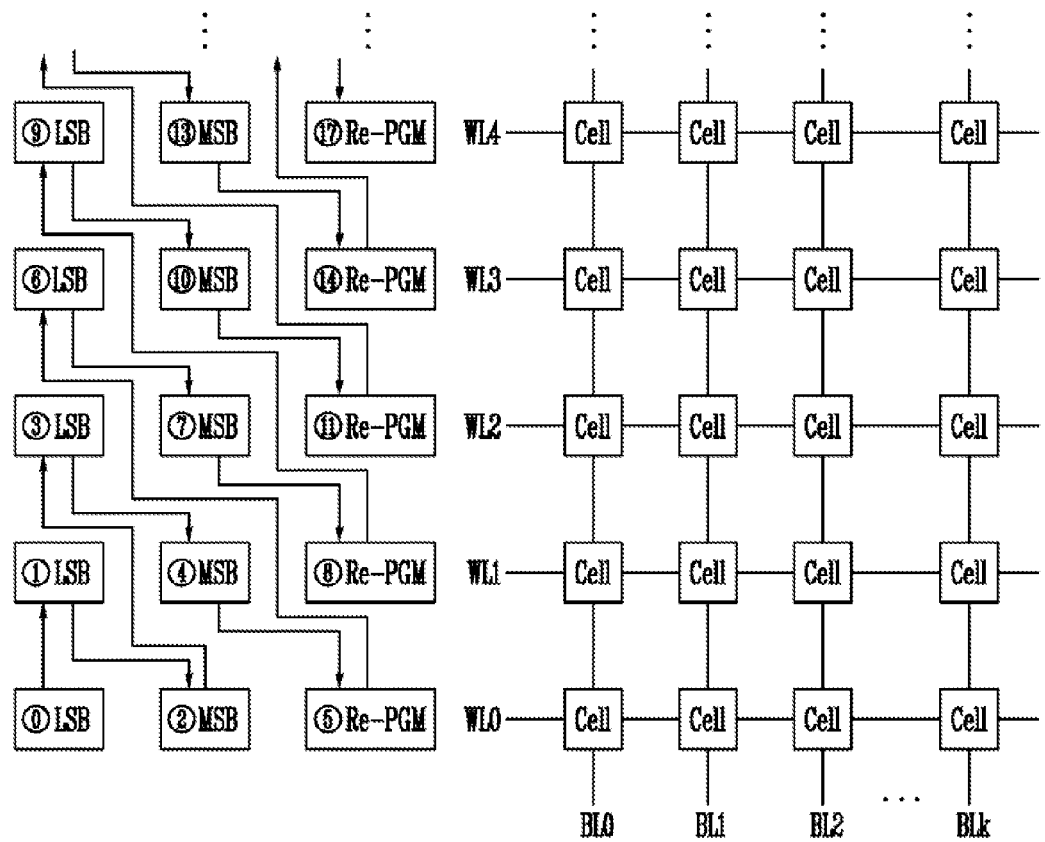
FIG. 5 is a view for explaining a method of operating a semiconductor apparatus in accordance with an embodiment of the present invention.

FIG. 5 is a view for explaining a method of operating a semiconductor apparatus in accordance with an embodiment of the present invention.

Referring to FIG. 5, when a memory device is operated using an MLC method, an LSB program loop (LSB) for storing LSB data in a memory cell and an MSB program loop (MSB) for storing MSB data therein may be performed. When an MSB program loop is performed on a next word line after an LSB program loop and an MSB program loop of a selected word line are completed, threshold voltages of memory cells of the selected word line may be changed due to a program interference phenomenon. Therefore, to reduce variations of the threshold voltages caused by an interference phenomenon, the MSB program loop may be completed so that the threshold voltages of the memory cells of the selected word line may be lower than target levels by set values. After the MSB program loop is performed on the next word line, a re-program loop Re-PGM may be performed so that the threshold voltages of the memory cells of the selected word line may be higher than the target levels. It may not matter if an interference phenomenon occurs when the re-program loop is performed on the next word line because relatively little interference occurs.

The order in which LSB program loops LSB, MSB program loops MSB, and re-program loops Re-PGM are performed on word lines WL0 to WL4 may be determined to further reduce variations in threshold voltages caused by a program interference phenomenon. For example, when it is assumed that the third word line WL2 is a selected word line, the LSB program loop may be performed on the selected word line WL2 before the MSB program loop is performed on the previous word line WL1. Subsequently, the MSB program loop on the selected word line WL2 may be completed before the MSB program loop on the next word line WL3 is completed. In addition, the re-program loop Re-PGM may be performed on the selected word line WL2 after the MSB program loop on the next word line WL3 is completed.

A data correction operation using error information as described above may be performed during a re-program operation. This will be described below in more detail.

Figure 6:
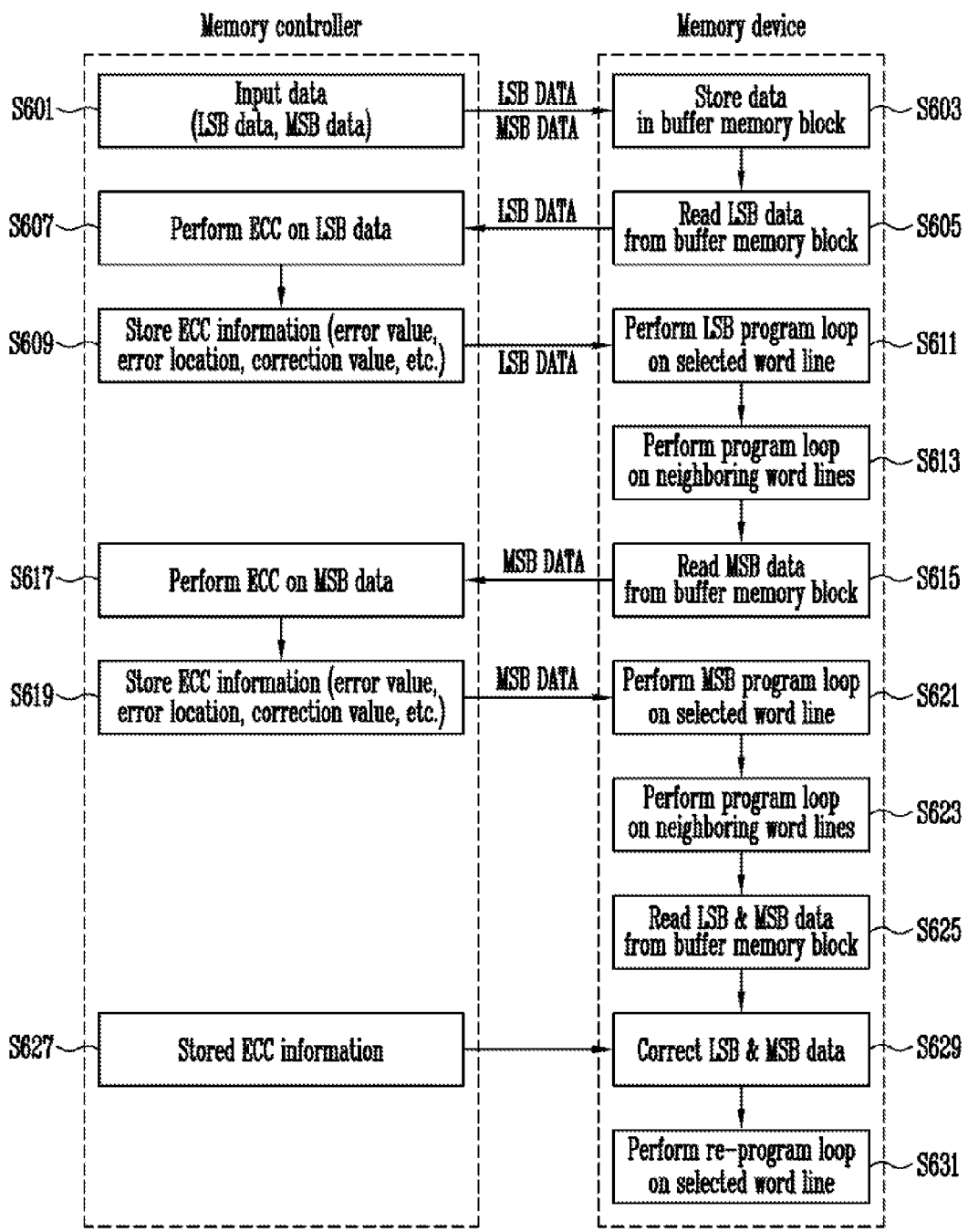
FIGS. 6 and 7 are transaction flowcharts each illustrating a method of operating the semiconductor apparatus shown in FIG. 5.
Figure 7:
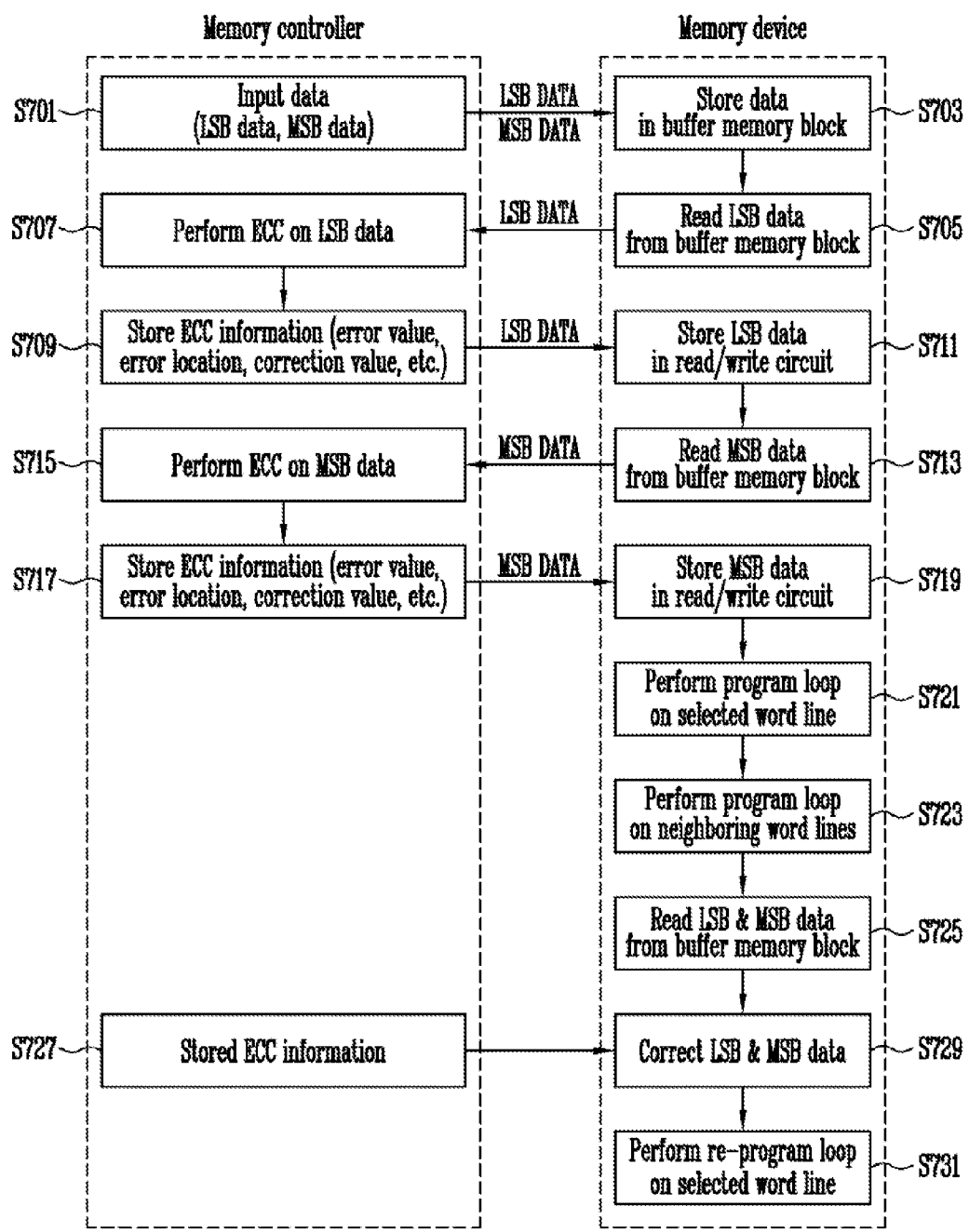

FIGS. 6 and 7 are transaction flowcharts each illustrating a method of operating the semiconductor apparatus shown in FIG. 5.

Referring to FIGS. 3, 5, and 6, when data to be stored in memory cells of the selected word line WL2 are input from the memory controller 100 at step S601, the data may be stored in the buffer memory block 210B of the memory device 200 at step S603. Here, first data (i.e., LSB data) and second data (i.e., MSB data) may be sequentially stored in the buffer memory block 210B. The LSB data and the MSB data may be stored in the buffer memory block 210B by an SLC method by the read/write circuit 240. Since the LSB data and the MSB data are stored in the buffer memory block 210B by the SLC method, a data storage rate may be very high. At step S605, the read/write circuit 240 may read the LSB data stored in the buffer memory block 210B and output the LSB data to the memory controller 100.

The memory controller 100 may perform an ECC operation on the LSB data at step S607. At this time, first error information (i.e., LSB error information) of the LSB data may be generated. The memory controller 100 may store the LSB error information, which is obtained by performing the ECC operation on the LSB data, in the storage 130 at step S609. In addition, the memory controller 100 may output the LSB data, on which the ECC operation is performed, to the memory device 200.

At step S611, the memory device 200 may perform an LSB program loop to store the LSB data, on which the ECC operation is performed, in memory cells of the selected word line WL2 included in the main memory block 210M. As a result, a threshold voltage distribution of the memory cells of the selected word line WL2 may be divided into an erase level and a program level. Program loops may be performed on neighboring word lines in a determined program order at step S613. For example, an MSB program loop may be performed on the previous word line WL1, a re-program loop may be performed on the neighboring word line WL0, and an LSB program loop may be performed on the next word line WL3. Subsequently, the read/write circuit 240 may read the MSB data stored in the buffer memory block 210B and may output the MSB data to the memory controller 100 at step S615.

The memory controller 100 may perform an ECC operation on the MSB data at step S617. At this time, second error information (i.e., MSB error information) of the MSB data may be generated. The memory controller 100 may store the MSB error information, which is generated by performing the ECC operation on the MSB data, in the storage 130 at step S619. In addition, the memory controller 100 may output the MSB data, on each of which the ECC operation is performed, to the memory device 200.

The memory device 200 may perform an MSB program loop to store the MSB data, on which the ECC operation is performed, in the memory cells of the selected word line WL2 included in the main memory block 210M at step S621. As a result, the threshold voltage distribution of the memory cells of the selected word line WL2 may be divided into an erase level and first to third program levels. Program loops may be performed on neighboring word lines in the determined program order at step S623. For example, a re-program loop may be performed on the previous word line WL1, an LSB program loop may be performed on the neighboring word line WL4, and an MSB program loop may be performed on the next word line WL3.

Subsequently, operations may be carried out to perform the re-program loop of the selected word line WL2. Both LSB data and MSB data may be used to perform the re-program loop.

At step S625, the read/write circuit 240 of the memory device 200 may read the LSB data stored in the buffer memory block 210B and store the read LSB data in the first internal latch (not illustrated), and the read/write circuit 240 of may read the MSB data and the read MSB data in the second internal latch (not illustrated). At step S627, the memory controller 100 may output the error information, which is generated at steps S607 and S617 and stored in the storage 130 at steps S609 and S619, to the memory device 200. The data change circuit 250 of the memory device 200 may correct error bits of the LSB data and the MSB data that are stored in the read/write circuit 240 based on the error information input from the memory controller 100 at step S629.

The read/write circuit 240 of the memory device 200 may perform a re-program loop on the memory cells of the selected word line WL2 based on the corrected. LSB data and MSB data at step S631. As the re-program loop is performed, widths of the threshold voltage distribution of the memory cells of the selected word line WL2 may be reduced, and threshold voltage distributions may be accurately controlled to correspond to the first to third program levels.

As a result, the entire program loop may be completed so that the LSB data and the MSB data may be stored in the memory cells of the selected word line WL2. Subsequently, the LSB data and the MSB data of the selected word line WL2 that are stored in the buffer memory block 210B may be deleted in subsequent processes.

As described above, since the LSB data and the MSB data are corrected using the error information stored in the memory controller 100, an ECC operation and related procedures may be omitted when a re-program loop is performed, so that the operation time may be reduced.

A program loop may be performed by using a one-shot program method in which threshold voltage distributions of memory cells are divided into an erase level and first to third program levels at a time based on LSB data and MSB data, without dividing the program loop into an LSB program loop and an MSB program loop, which will be described below.

Referring to FIGS. 3, 5, and 7, steps S701 to S709 may be performed in substantially the same manner as steps S601 to S609 are performed as described above. At steps S701 to S709, an ECC operation may be performed on the LSB data read from the buffer memory block 210B, and error information of the LSB data may be stored in the storage 130 of the memory controller 100.

The memory device 200 may store the LSB data, on which the ECC operation is performed, in the internal latch (not illustrated) of the read/write circuit 240 step S711.

Operations at steps S713 to S717 may be performed in substantially the same manner as the operations at steps S615 to S619 are performed as described above. At steps S713 to S717, an ECC operation may be performed on the MSB data read from the buffer memory block 210B, and error information of the MSB data may be stored in the storage 130 of the memory controller 100.

The memory device 200 may store the MSB data, on each of which the ECC operation is performed, in the internal latch (not illustrated) of the read/write circuit 240 at step S719.

The memory device 200 may perform a main program loop (one-shot program loop) to store the LSB data and the MSB data, on each of which the ECC operation is performed, in the memory cells of the selected word line WL2 at step S721. As a result, threshold voltage distributions of the memory cells of the selected word line WL2 may be dispersed from an erase level to four levels, which are an erase level and first to third program levels. Program loops may be performed on neighboring word lines in a predetermined program order at step S723. When a one-shot program loop is performed, a re-program loop may be performed on the previous word line WL1, and a main program loop may be performed on the next word line WL3.

Subsequently, operations may be carried out to perform a re-program loop on the selected word line WL2. Both LSB data and MSB data may be used to perform the re-program loop. Operations at steps S725 to S731 may be performed in subsequently the same manner as the operations at steps S625 to S631 are performed as described above to perform the re-program loop on the selected word line WL2.

Figure 8:
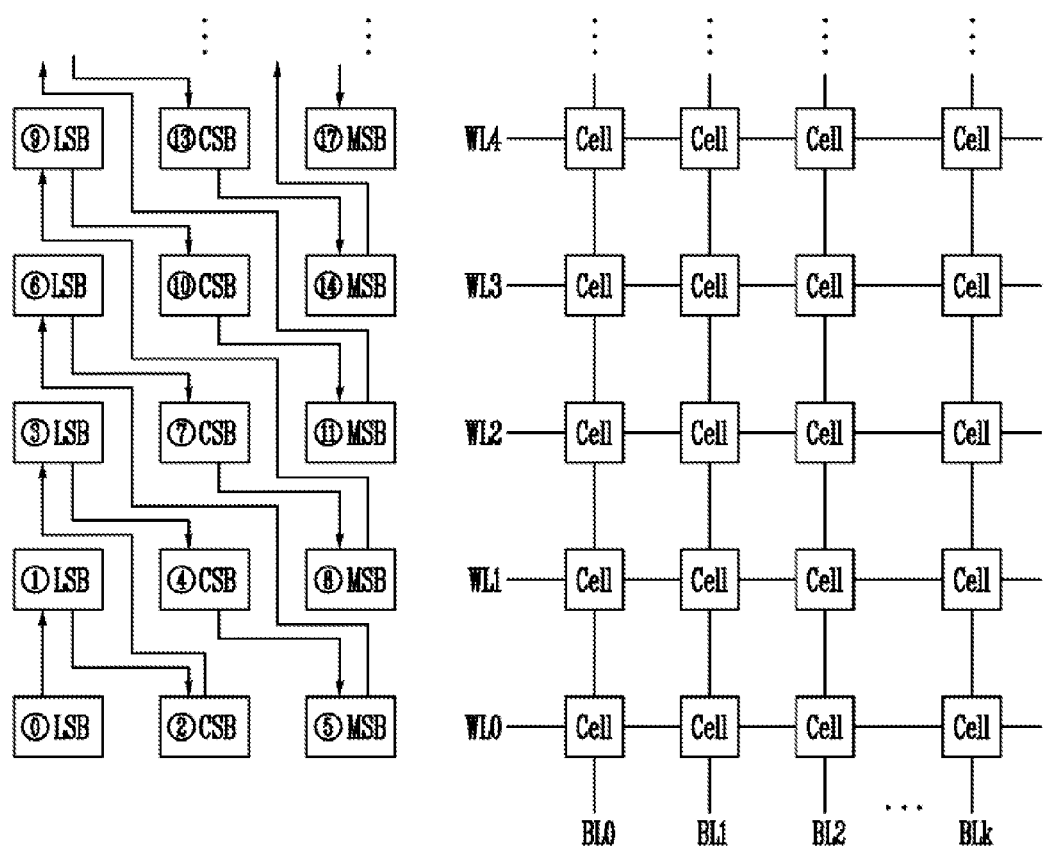
FIG. 8 is a view for explaining a method of operating a semiconductor apparatus in accordance with another embodiment of the present invention.

FIG. 8 is a view for explaining a method of operating a semiconductor apparatus in accordance with another embodiment of the present invention.

Referring to FIG. 8, when a memory device is operated using a TLC method, an LSB program loop (LSB) may be performed to store LSB data in a memory cell, a CSB program loop (CSB) may be performed to store CSB data therein, and an MSB program loop (MSB) may be performed to store MSB data therein. Threshold voltages of memory cells of a selected word line may be changed due to an interference phenomenon that may occur in the memory cells of the selected word line when a program loop is performed on neighboring word lines.

Therefore, the order in which LSB program loops (LSB), CSB program loops (CSB), and MSB program loops (MSB) are performed on the word lines WL0 to WL4 may be determined to reduce variations in threshold voltages caused by a program interference phenomenon. For example, when it is assumed that the third word line WL2 is a selected word line, LSB, CSB, and MSB program loops may be performed in such an order that the CSB program loop may be performed on the previous word line WL0, the LSB program loop may be performed on the selected word line WL2, the CSB program loop may be performed on the previous word line WL1, the MSB program loop may be performed on the previous word line WL0, the LSB program loop may be performed on the next word line WL3, the CSB program loop may be performed on the selected word line WL2, the MSB program loop may be performed on the previous word line WL1, the LSB program loop may be performed on the next word line WL4, the CSB program loop may be performed on the next word line WL3, and the MSB program loop may be performed on the selected word line WL2.

A data correction operation using error information may be performed in the CSB program loop and the MSB program loop. This will be described below in detail.

FIGS. 9 to 11 are transaction flowcharts each illustrating a method of manufacturing the semiconductor apparatus shown in FIG. 8.

Referring to FIGS. 3, 8, and 9, when data to be stored in memory cells of the selected word line WL2 are read from the memory controller 100 at step S901, the data may be stored in the buffer memory block 210B of the memory device 200 at step S903. At this time, first data (i.e., LSB data), second data (i.e., CSB data), and third data (i.e., MSB data) may be sequentially input and stored in the buffer memory block 210B. The LSB data, the CSB data, and the MSB data may be stored in the buffer memory block 210B by an SLC method by the read/write circuit 240. Since the LSB data, the CSB data, and the MSB data are stored in the buffer memory block 210B by the SLC method, a data storage rate may be very high. At step S905, the read/write circuit 240 may read the LSB data stored in the buffer memory block 210B and output the LSB data to the memory controller 100.

At step S907, the memory controller 100 may perform an ECC operation on the LSB data. At this time, first error information (i.e., LSB error information) of the LSB data may be generated. The memory controller 100 may store the LSB error information, which is generated by performing the ECC operation on the LSB data, in the storage 130 at step S909. In addition, the memory controller 100 may output the LSB data, on which the ECC operation is performed, to the memory device 200.

The memory device 200 may store the LSB data, on which the ECC operation is performed, in a first internal latch (not illustrated) of the read/write circuit 240 at step S911. The read/write circuit 240 may read the CSB data stored in the buffer memory block 210B and output the CSB data to the memory controller 100 at step S913.

The memory controller 100 may perform an ECC operation on the CSB data at step S915. At this time, second error information (i.e., CSB error information) of the CSB data may be generated. The memory controller 100 may store the CSB error information, generated by performing the ECC operation on the CSB data, in the storage 130 at step S917. In addition, the memory controller 100 may output the LSB data, on which the ECC operation is performed, to the memory device 200.

The memory device 200 may store the CSB data, on which the ECC operation is performed, in a second internal latch (not illustrated) of the read/write circuit 240 at step S911. By performing operations at steps S921 to S927 by substantially the same method as described above, the memory device 200 may store the MSB data, on which the ECC operation is performed, in a second internal latch (not illustrated) of the read/write circuit 240.

The memory device 200 may perform a first program loop (i.e., LSB program loop) so that the LSB data, the CSB data, and the MSB data, on each of which the ECC operation is performed, may be stored in memory cells of the selected word line WL2 included in the main memory block 210M at step S929. A TLC program loop may include an LSB program loop, a CSB program loop, and an MSB program loop. In this example, when the LSB program loop is completed, threshold voltage distributions of the memory cells of the selected word line WL2 may be divided into an erase level and a program level. In another example, the TLC program loop may be performed using a one-shot program method in which threshold voltage distributions of memory cells may be divided into an erase level and first to seventh program levels at a time based on the LSB data, the CSB data, and the MSB data, without dividing the TLC program loop into the LSB program loop, the CSB program loop and the MSB program loop. In this example, when the first program loop is completed, threshold voltage distributions of the memory cells of the selected word line WL2 may be divided into an erase level and seven program levels. The threshold voltage distributions of the memory cells may have a greater width than final target distributions, and there may be a significant level difference between the threshold voltage distributions of the memory cells and the final target distributions.

Program loops may be performed on neighboring word lines according to a predetermined program order at step S931. For example, a CSB program loop of the previous word line WL1, an MSB program loop of the neighboring word line WL0, and an LSB program loop of the next word line WL3 may be performed.

As described above, the ECC operation may be performed on each of the LSB data, the CSB data, and the MSB data. They may sequentially be input to the memory device 200 at S911, S919, and S927, respectively, and may be stored in the read/write circuit 240. However, the LSB data, the CSB data, and the MSB data, on each of which the ECC operation is performed, may be sequentially output at a time. An example thereof will be described below.

Referring to FIG. 10, the error information of the LSB data and the CSB data, obtained by performing the ECC operation at steps S909 and S917, may be stored in the storage 130 of the memory controller 100 and may not be output to the memory device 200. In other words, steps S911 and S919 may be omitted. In addition, at steps S921, S923, and S925, the ECC operation may be performed on the MSB data, and the error information, which is obtained by performing the ECC operation, may be stored in the storage 130 of the memory controller 100. After the error information of each data is stored in the storage 130, the LSB data, the CSB data, and the MSB data, on each of which the ECC operation is performed, may be sequentially output to the memory device.

The memory device 200 may store the LSB data, the CSB data, and the MSB data, on each of which the ECC operation is performed, in first to third internal latches (not illustrated) of the read/write circuit 240, respectively, at step S928. Subsequently, the memory device 200 may perform a first program loop (i.e., LSB program loop) so that the LSB data, the CSB data, and the MSB data, on each of which the ECC operation is performed, may be stored in the memory cells of the selected word line WL2 of the main memory block 210M at step S929. In addition, program loops may be performed on neighboring word lines in a predetermined program order at step S931.

Since the LSB data, the CSB data, and the MSB data, on each of which the operation is performed, are sequentially input to the memory device 200 at a time, time required to perform operations may be reduced.

In addition, if the memory device 200 may perform the operation at step S913 at the same time as the memory controller 100 performs the operations at steps S907 or S909, and the memory device 200 may perform the operation at step S921 at the same time as the memory controller 100 performs step S915 or S917, time required to perform operations may be reduced.

Subsequently, operations may be carried out to perform a second program loop (i.e., CSB program loop) on memory cells of the selected word line WL2.

Referring to FIG. 11, the read/write circuit 240 of the memory device 200 may read the LSB data stored in the buffer memory block 210B and may store the LSB data in the first internal latch (not illustrated) at step S933. The memory controller 100 may output the LSB error information of the LSB data stored in the storage 130 to the memory device 200 at step S935. The data change circuit 250 of the memory device 200 may correct the LSB data stored in the first internal latch of the read/write circuit 240 based on the LSB error information at step S937.

The read/write circuit 240 of the memory device 200 may read the CSB data stored in the buffer memory block 210B and may store the CSB data in the second internal latch (not illustrated) at step S939. The memory controller 100 may output the CSB error information of the CSB data stored in the storage 130 to the memory device 200 at step S941. The data change circuit 250 of the memory device 200 may correct the CSB data, which is stored in the second internal latch of the read/write circuit 240, based on the CSB error information at step S943.

Similarly, at steps S945, S947, and S949, the MSB data may be read from the buffer memory block 210B, and the MSB data may be corrected using the MSB error information stored in the storage 130 of the memory controller 100.

The order in which the above-described operations are performed may be changed. For example, after the operations at steps S933, S935, S939, S941, S945, and S947 are sequentially performed, the operations at steps S939, S934, and S949 may be sequentially or simultaneously performed.

Subsequently, the memory device 200 may perform a second program loop (i.e., CSB program loop) on the memory cells of the selected word line WL2, which are included in the main memory block 210M, based on the LSB data, the CSB data, and the MSB data corrected by the data change circuit 250 based on the error information at step S951. When a TLC program loop includes an LSB program loop, a CSB program loop, and an MSB program loop, threshold voltage distributions of the memory cells of the selected word line WL2 may be divided into an erase level and three program levels by the CSB program loop. In addition, when the TLC program loop is performed using a one-shot program method, the widths of the threshold voltage distributions of the memory cells divided into the erase level and the first to seventh program levels by the first program loop may be reduced by the second program loop. In addition, the level difference between the threshold voltage distributions of the memory cells and the final target distributions may be reduced by the second program loop.

Program loops may be performed on neighboring word lines in a predetermined program order at step S953. For example, the third program loop (i.e., MSB program loop) of the previous word line WL1, the first program loop (i.e., LSB program loop) of the neighboring word line WL4, and the second program loop (i.e., CSB program loop) of the next word line WL3 may be performed.

Subsequently, operations may be carried out to perform a third program loop (i.e., MSB program loop) on the memory cells of the selected word line WL2 included in the main memory block 210M. The third program loop (i.e., MSB program loop) may be performed by substantially the same method as the operations at steps S933 to S951 are performed as described above. When a TLC program loop includes an LSB program loop, a CSB program loop, and an MSB program loop, the threshold voltage distributions of the memory cells of the selected word line WL2 may be divided into an erase level and seven program levels by the MSB program loop. In addition, when the TLC program loop is performed by a one-shot program method, widths of the threshold voltage distributions of the memory cells divided into the erase level and the first to seventh program levels by the second program loop may be reduced by the third program loop. In addition, the threshold voltage distributions of the memory cells may correspond to the final target distributions by the third program loop.

In accordance with the embodiments of the present invention, operation reliability may be improved, and operation time may be reduced.

While the present invention has been described with respect to the specific embodiments, it should be noted that the embodiments are for describing, not limiting, the present invention. Further, it should be noted that the present invention may be achieved in various ways through substitution, change, and modification, by those skilled in the art without departing from the scope of the present invention.

What is claimed is:

1. A method of operating a memory device, the method comprising:
   transmitting a first page data and a second page data among a plurality of page data stored in a buffer memory block to a memory controller;
   receiving, from the memory controller, the first page data and the second page data, on which an error checking and correction (ECC) operation is performed, respectively;
   performing a first program loop to store the received first page data in a main memory block;
   performing a second program loop to store the received second page data in the main memory block;
   receiving error information of the first page data and the second page data, which is obtained through performing the ECC operation on the first page data and the second page data, respectively from a memory controller; and
   performing a third program loop to store the first page data and second page data, corrected by using the received error information, in the main memory block.

2. The method of claim 1, wherein the performing of the first program loop comprises:
   transmitting the first page data to the memory controller;
   receiving the first page data, on which the error checking and correction (ECC) operation performed from the memory controller; and
   storing the first page data, on which the ECC operation is performed to the main memory block, and
   wherein the performing of the second program loop comprising:
   transmitting the second page data to the memory controller;
   receiving the second page data, on which the ECC operation is performed from the controller; and
   storing the second page data, on which the ECC operation is performed in the main memory block.

3. The method of claim 1, wherein the error information comprises a location and a correction value of an error bit included in the first page data and the second page data.

4. The method of claim 1, wherein the error information comprises a column address and a corrected bit of an error bit included in the first page data and the second page data.

5. The method of claim 1, wherein the first page data includes a least significant bit (LSB) data and the second page data includes a most significant bit (MSB) data, and
   the third program loop is performed to re-program the LSB data and the MSB data.

6. The method of claim 1, wherein the correcting of the first page data and the second page data includes performing an exclusive OR (XOR) operation on the first page data and the second page data using the error information.

7. The method of claim 1, wherein the first and the second program loop is performed to set threshold voltages of memory cells of a selected word line in the main memory block to be lower than target levels of the memory cells by set values, and
   the third program loop is performed to set the threshold voltages of memory cells of the selected word line in the main memory block to be higher or equal to the target levels of the memory cells.

8. A method of operating a memory device, the method comprising:
   transmitting a first page data, a second page data and the third page data among a plurality of page data stored in a buffer memory block to a memory controller;
   receiving, from the memory controller, the first page data, the second page data and the third page data, on which an error checking and correction (ECC) operation is performed, respectively;
   performing a first program loop to store the first page data, the second page data and the third page data, on which the ECC operation is performed in a main memory block of the memory device;
   receiving, from the memory controller, error information of the first page data, the second page data and the third page data, which is obtained through performing the ECC operation on the first page data, the second page data and the third page data, respectively; and
   performing a second program loop to store the first page data, the second page data and the third page data, corrected by using the error information, in a main memory block of the memory device.

9. The method of claim 8, wherein the error information includes a location and a correction value of an error bit included in the first page data and the second page data.

10. The method of claim 8, wherein the error information includes a column address and a corrected bit of an error bit included in the first page data and the second page data.

11. The method of claim 8, wherein the performing of the second program loop comprises:
    correcting the first page data, the second page data and the third page data by using the error information, respectively; and
    storing the corrected first page data, the corrected second page data and the corrected third page data in the main memory block of the memory device.

12. The method of claim 11, wherein the correcting the first page data, the second page data and the third page data comprises performing an exclusive OR (XOR) operation using the error information to the first page data, the second page data and the third page data.

13. The method of claim 8, wherein first page data includes a least significant bit (LSB) data, the second page data includes a most significant bit (MSB) data, and the third page data includes a center significant bit (CSB) data.

14. The method of claim 8, wherein the first program loop is performed to set threshold voltages of memory cells of a selected word line in the main memory block to be lower than target levels of the memory cells by set values, and
the second program loop is performed to set the threshold voltages of memory cells of the selected word line in the main memory block to be higher or equal to the target levels of the memory cells.

* * * * *